Dec. 25, 1951  A. SCHNITT  2,580,363
ROTOR BLADE CONSTRUCTION
Filed Oct. 23, 1947  3 Sheets-Sheet 1
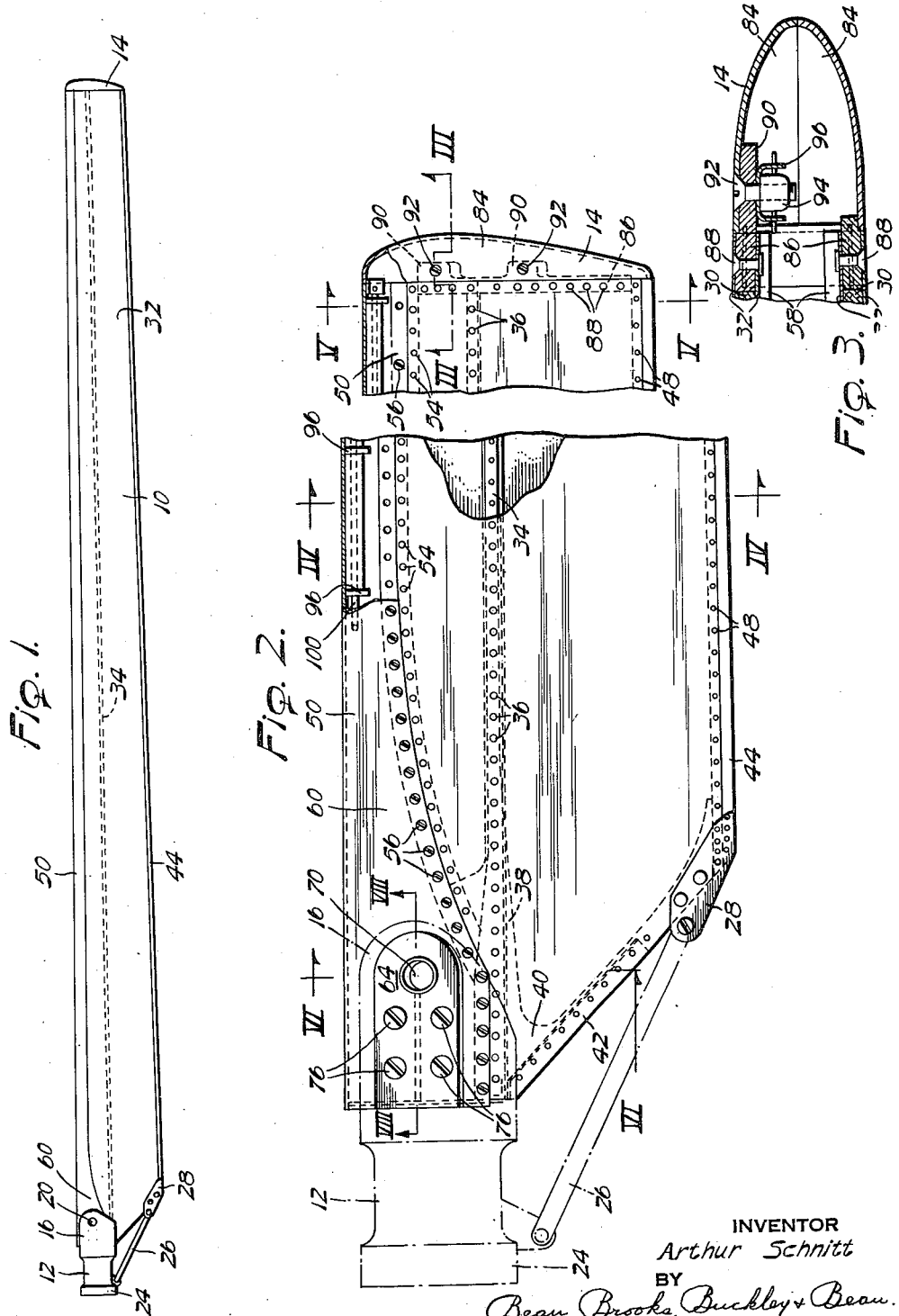
INVENTOR
Arthur Schnitt
BY
Bean, Brooks, Buckley & Bean
ATTORNEYS

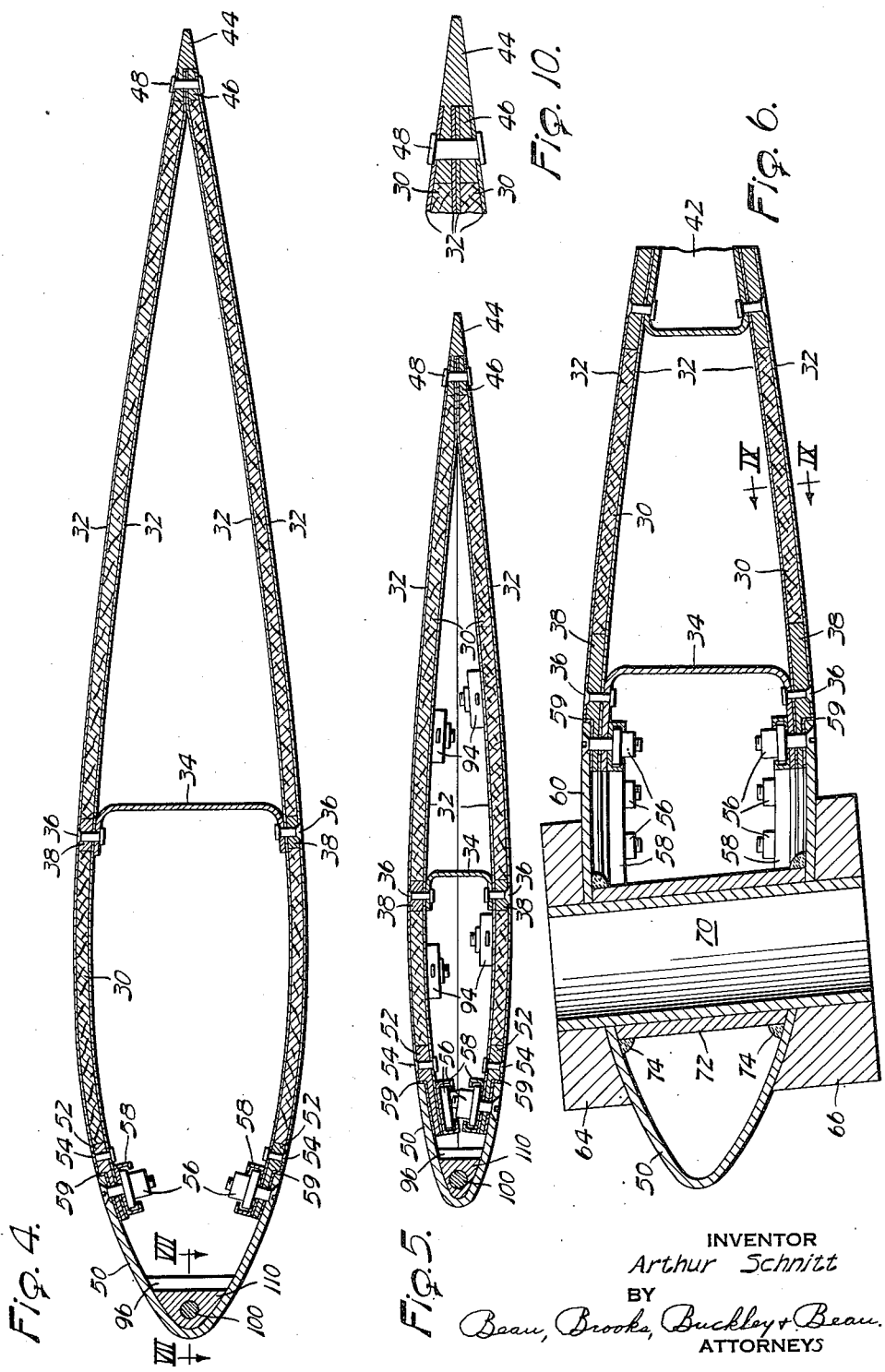

Dec. 25, 1951  A. SCHNITT  2,580,363
ROTOR BLADE CONSTRUCTION
Filed Oct. 23, 1947  3 Sheets-Sheet 3
*Fig. 7.*
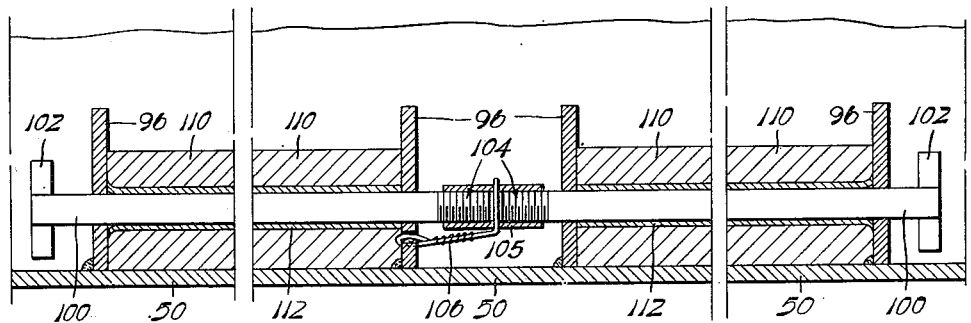
*Fig. 8.*
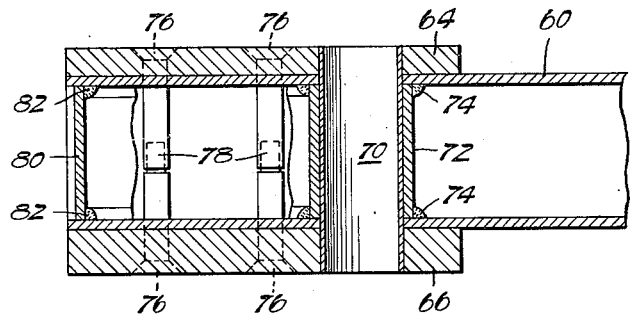
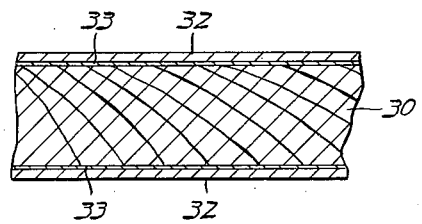
*Fig. 9.*
INVENTOR
*Arthur Schnitt*
BY
*Beau, Brooke, Buckley & Beau.*
ATTORNEYS Patented Dec. 25, 1951

2,580,363

UNITED STATES PATENT OFFICE 2,580,363

ROTOR BLADE CONSTRUCTION

Arthur Schnitt, Buffalo, N. Y., assignor to Bell
Aircraft Corporation, Wheatfield, N. Y.

Application October 23, 1947, Serial No. 781,627

6 Claims. (Cl. 170—159)

This invention relates to rotary wing aircraft, and more particularly to the construction of blades for rotors in helicopter aircraft and the like.

One of the objects of the invention is to provide an improved rotor blade design so that it will be practicable to manufacture large numbers of such blades so as to be identical in all necessary respects so that they are truly interchangeable in service. Another object of the invention is to provide an improved rotor blade whereby to avoid moisture absorption and variable warping such as is inherent in conventional wooden blades, for example. Another object of the invention is to provide an improved rotor blade construction which lends itself particularly to quantity production operations. Another object of the invention is to provide a rotor blade construction which provides for ready access to the interior thereof such as for periodic inspections.

Another object of the invention is to provide an improved rotor blade wherein the chordwise and spanwise positions of the center of gravity thereof may be adjusted at will even after final fabrication. Another object of the invention is to provide a rotor blade construction embodying the features aforesaid in combination with improved external smoothness. Another object of the invention is to provide a rotor blade structural design which is adaptable to any aerodynamic shape and which permits such blades to be manufactured to extremely close tolerances.

Another object of the invention is to provide an improved rotor blade design whereby the positions of the center of gravity and of the elastic axis and of the neutral axis (about the major axis of the blade) are all located at will and can be approximately at the position of the center of pressure thereon. Another object of the invention is to provide a rotor blade construction embodying the features and advantages set forth hereinabove in addition to possessing sufficient stiffness against bending of the blade about its major axis to obtain a high natural bending frequency in that direction.

Another object of the invention is to provide a rotor blade fabrication design which readily permits air-sealing of the hollow blade, so as to prevent centrifugal pumping of air through the hollow portion of the blade with consequent loss of power.

Another object of the invention is to provide a rotor blade fabrication design wherein counterweight means are distributed longitudinally of the blade for balance adjustment purposes, in such manner as to avoid the carrying of loads through the counterweight elements and to avoid affecting of the elastic properties of the blade.

Other objects and advantages of the invention will appear in the specification hereinafter.

In the drawings:

Fig. 1 is a top plan of a rotor blade of the invention;

Fig. 2 is a fragmentary plan view, on an enlarged scale, with portions of the skin structure broken away to show the interior;

Fig. 3 is a fragmentary section along line III—III of Fig. 2;

Fig. 4 is a typical chordwise section of the blade as at line IV—IV of Fig. 2;

Fig. 5 is a chordwise section of the blade as at line V—V of Fig. 2;

Fig. 6 is a chordwise section of the blade as at line VI—VI of Fig. 2;

Fig. 7 is a fragmentary section taken along line VII—VII of Fig. 4;

Fig. 8 is a fragmentary section taken along line VIII—VIII of Fig. 2;

Fig. 9 is a fragmentary section, on an enlarged scale, taken along line IX—IX of Fig. 6; and Fig. 10 is an enlarged fragmentary sectional view of the trailing edge construction of the blade.

The drawing illustrates the invention as being incorporated in a rotor blade which is illustrated in Fig. 1 to comprise generally a main blade portion 10, a blade root bracket 12, and a tip piece 14. It will be understood of course that the root bracket 12 may be of any suitable construction inasmuch as it is not specifically a part of the present invention, and that this invention can be applied equally as well to other type blades such as to a hinged rotor blade having a different root end configuration. However, as shown herein the bracket 12 includes a clevis portion 16 which is adapted to embrace at opposite sides the root end of the blade structure and to be pinned thereto as by a pin 20. The bracket 12 also includes a bearing socket portion 24 which is arranged to engage upon the rotor hub structure; and it will be understood that the mode of connection between the bracket 12 and the hub structure may be of any suitable type and is not a part of the present invention. A sway brace 26 is illustrated in Figs. 1-2 to extend from the bracket 12 into connection with a bracket 28 which is bolted to the trailing edge portion of the blade structure so as to brace the blade against pivoting upon the pin 20 relative to the bracket 12.

The main portion of the blade is generally hollow or semi-monocoque, and comprises four subassemblies; namely, upper and lower surface portions, a bent steel nose plate, and a surface spacer. These parts may be easily and inexpensively made to accurately provide the prescribed profile for the blade. The upper and lower surface portions each comprises a laminar fabrication consisting of a light weight wood sheet center 30 and cover sheets 32—32 made of aluminum alloy or other dense material. The sandwich fabrications are plastic-cemented together as indicated at 33 (Fig. 9) and coated at all marginal edges thereof so as to weather-seal the wood elements of the structure. This prevents moisture absorption into the wood elements, such as would otherwise result in weight variances, warpage tendencies, and the like. The sandwich stock is so designed and selected as to provide, when assembled in the rotor blade, a stiffened skin which is of such strength as to successfully resist the pressures deriving from the action of centrifugal forces upon the atmosphere within the hollow of the blade, while at the same time providing a blade skin construction which is effectively resistant to normal usage buffeting and the like.

The upper and lower sandwich assemblies are attached to the spacer which is in the form of a spar member 34 formed of a light weight metal channel section extending spanwise of the blade. The web dimension of the blade tapers from the root end of the blade to the tip end, and the flange portions of the spar are riveted to the upper and lower surface structures, as by means of flush-headed rivets 36. In the region of penetration of the rivets 36, a strip 38 of metal or hardwood or the like is inlaid between the cover sheets 32—32 in lieu of the relatively soft wood filler 30, and toward the root end of the blade the strip 38 is laterally expanded into a web-like formation 40 (Fig. 2) which extends around and along the root end edge portion 42 of the blade and joins the trailing edge strip 44. The trailing edge strip 44 is of triangular sectional shape and made of light weight metal which is recessed at its bottom edge to receive in slip-fitted relation the rear edges of the two inner sheets 32—32; and a filler strip 46 is set in place and included in the riveted assembly to complete the structure. The top and bottom surfaces of the edge pieces 44—46 are rabbeted to permit the top and bottom cover sheet pieces 32—32 to lie thereon in flush relation and in smooth continuation of the top and bottom surfaces of the strip piece 44—46. Rivets 48 passing through all the four cover sheets and the strips 44—46 lock the assembly along the trailing edge portion of the blade.

An important feature of the design of the invention resides in the fact that the sandwich assemblies possess individually high stiffness and strength in all directions, and this factor avoids any need for the use of multiple ribs or the like interiorly of the blade structure. Consequently, the overall riveting requirements are minimized, thereby keeping down manufacturing costs and providing optimum external contour smoothness. The sandwich fabrications may be readily arranged to be processed in molds in such manner that the contour skin portion of each sandwich fabrication is disposed next to the mold while the fluid pressure is applied against the inner surface of the fabrication. Hence, the outer contour of the blade will be as accurate and as smooth as the surfaces of the mold in which the sandwich fabrications are processed; thereby again providing an improved blade construction at minimum manufacturing costs. The extreme stiffness-to-weight ratio of the sandwich stock material enables the upper and lower sandwich surface portions of the blade to be constructed so as to withstand the constant as well as the oscillating air pressures acting both externally on the blade and as a result of the centrifugal force acting on the column of air within the blade. Thus, the blade surfaces undergo only minute deflections under these loads, while at the same time successfully resisting the locally high compressive stresses due to relatively high elastic bending in a fixed root type blade. Thus, although the sandwich stock material which is employed aft of the spacer element 34 may be selected to employ extremely thin and light weight metal face elements in order to assist in bringing the chordwise center of gravity of the blade well forward as in the region of the quarter chord, the thin metal face surfaces are cemented to the wood filler 30 and riveted as an assembly to the spar 34 which carries the coning loads on the blade, whereby buckling of the face metal elements between rivets is avoided, thereby eliminating the possibility of fatigue failure in the skin structure and surface roughness.

The blade assembly portion including the spar 34 and extending aft therefrom comprises a torsionally rigid structure because of the uniquely cooperating sandwich surface elements, the trailing edge member 44, and the spar 34. Thus, the aft blade portion easily maintains the geometric twist prescribed and initially built into the blade. Since the beam 34 is the only structure which separates the sandwich assemblies and maintains the overall blade shape, the holding of close tolerances on the height of the beam during manufacture thereof assures the same close tolerances on the blade contour. Structurally, the beam carries part of the blade shear and therefore its size and chordwise location partially controls the position of the shear center of the blade. Also, it carries the air pressures described previously between the upper and lower surfaces, and supports the sandwich panels against compression buckling.

The leading edge portion of the blade comprises a steel plate which is bent to define the prescribed sectional profile of the nose portion of the blade and to abut in streamlined continuation with the upper and lower sandwich assemblies wood-metal blade surfaces. The connections between the upper and lower edges of the nose piece 50 and the top and bottom blade surfaces are provided by means of stepped metal strips 52 which in each case is partially inlaid between the front edges of the paired cover plates 32—32 and locked thereto as by means of flush-headed rivets 54. At their forward edges the strips 52 are formed with extending ledges receiving in overlapping relation thereon the rear edges of the nose piece 50, and the nose piece is detachably fixed to the strips 52—52 by means of bolt and elastic nut devices 56. Gang channel pieces 58 are set under the nut portions of the bolt nut units to extend lengthwise of the strips 52 so as to hold the nuts against rotation whenever the bolts are being driven from externally of the structures. Preferably, a soft gasket 59 is inserted under the lapping edge portions of the nose piece 50 to air and weather-seal the hollow blade structure.

Adjacent the root end of the blade the steel nose piece 50 is swelled in plan view as indicated at 60 (Figs. 1-2), so that the enlarged root end portion of the steel nose piece embraces the hub pin 20. Top and bottom bearing plates 64—66 (Figs. 2 and 6) which are contoured at their inner surfaces to complement the curved outer surfaces of the nose plate 50 are provided to reinforce the latter in the region of the pin. The plates 64—66 are externally flat-surfaced to provide top and bottom bearing surfaces over which the hub clevis 16 slip-fits when being assembled on the blade.

The nose portion 60 and the bearing plates 64—66 are all perforated in vertical alignment (Figs. 6-8) to receive a bearing sleeve 70 which is dimensioned to receive the hub bracket pin 20. A spacer tube 72 enclosing the tube 70 is welded as at 74 to extend between the upper and lower portions of the nose piece so as to carry the shear loads in the region of the bracket clevis mounting. The nose portion 60 and the bearing plates 64—66 are also suitably apertured to receive therethrough locking screws 76 which, as shown in Fig. 8, are arranged in pairs having telescoping threaded ends 78 whereby to firmly clamp the bearing plates 64—66 to the nose piece. Preferably, the root end portion of the nose piece 60 is closed by means of a plate 80 (Fig. 8) which is welded as indicated at 82 at its marginal edges to the nose plate.

Thus, it will be appreciated that the bent steel nose piece 50 engages at the root end of the blade directly upon the hub connection pin 20 and extends therefrom throughout the entire length of the blade to provide at the same time a centrifugal load carrying member, a spar member which is substantially rigid against torsion and deflection in all directions, and an armored leading edge to protect the blade against water erosion and battering by objects coming in contact with the blade under operating conditions. Also, it will be appreciated that the relatively heavy (steel) metal of the nose piece 50 acts in combination with the extremely light metal-wood sandwich material of the body surfaces of the blade to enable the blade design to efficiently meet all load requirements while attaining an extremely lightweight overall structure in combination with disposition of the portions of the center of gravity and of the elastic axis and of the neutral axis (about the major axis of the blade) at approximately the chordwise position of the center of pressure against the blade at all stations throughout the span of the blade even though the blade tapers in planform and varies in its thickness ratio and bending stiffness characteristics from the root end to the tip end of the blade.

The tip end of the blade is enclosed by the cap piece 14 which is conveniently fabricated in the form of two pressed metal halves 84—84 (Fig. 3) which are complementary shaped and adapted to cover the end of the blade in smooth continuation of the surfaces thereof (Figs. 2-3). To affix the tip pieces 84—84 to the blade structure, a band of metal 86 (Figs. 2-3) is inlaid between the paired cover sheet members 32—32 along the tip edges thereof, and is fastened to the blade members by means of rivets 88. The band 86 is formed with laterally extending ears 90 which are recessed at their outer surfaces so as to receive the tip pieces 84—84 in lapped relation thereon so that the outer surfaces of the tip pieces are flush with the outer surfaces of the skin of the main body portion of the blade. Screws 92 fasten the tip pieces to the ears 90; elastic nuts 94 being carried by brackets 96 at the opposite sides of the ears to receive the threaded ends of the screws.

To arrange for adjustment of the chordwise position of the center of gravity of the blade structure at the various stations spanwise thereof the nose piece 50 is provided interiorly thereof with plates 96 at intervals spanwise therealong, and the plates 96 are drilled in relative alignment. A pair of steel rods 100—100 having end handles 102 are adapted to be manually inserted through the plates 96 from opposite ends of the blade structure (when the hub bracket and tip cover elements are removed) into abutting relation at the center of the blade, as illustrated in Fig. 7. At their abutting end portions the rods are threaded as indicated at 104 to receive a locking collar 105, and the collar is laterally drilled to receive a locking wire 106 to prevent unintended rotation thereof. Thus, the rods 100—100 are adapted to mount thereon drilled metal pieces 110 which may be formed of lead or some other relatively heavy weight material. Preferably the weights 110 are internally bushed with wear resistant metal as indicated at 112 so as to prevent wearing away of the soft metal such as would permit the counterweights to become loosened on the rods 100. The counterweights 110 are longitudinally dimensioned so as not to accurately fit between adjacent partition plates 96, thus allowing for thermal expansion. It will be understood that suitable counterweights may be inserted and mounted upon the rods 100 at any desired station spanwise of the blade and thereupon positioned within the nose portion of the blade to give the desired relative disposition of the masses comprising the blade fabrication. Thus, it will be understood that the chordwise center of gravity of the blade structure may be accurately regulated and adjusted as may be preferred in any given case without alteration of the outer contour dimensions and shape of the blade structure. Since the counterweights 110 are relatively short in their spanwise dimensions, substitution of weights having different masses will not affect the elastic properties of the blade and the bending stiffness or the shear center thereof.

Also, it will be appreciated that the construction of the invention permits such blades to be manufactured in quantities to be interchangeable with uniform operating results because in every case the total weight and the spanwise and chordwise positions of the center of gravity and the center of percussion of each blade can be made identical by simply adding or substracting balanced weights from the nose of the blade, subsequent to final fabrication of each blade.

Another feature and advantage of the present invention is that the blade construction thereof permits ready accessibility to all of the internal structures thereof for periodic inspection purposes, it being only necessary to withdraw the screws 56-88 to separate the nose and tip cover portions from the body portion of the blade. Also, by reason of the extreme flexibility for relative disposition of the structural masses of the blade structure of the invention, it will be readily apparent that the center of gravity and the elastic axis and the neutral axis (about the major axis of the blade) may be readily arranged at any desirable positions and to coincide approximately with the chordwise position of the center of aerodynamic pressure against the blade under operating conditions, and that these conditions may be arranged to exist at all stations throughout the span of the blade although the blade may be of such design as to vary in planform thickness and in thickness ratio and in bending stiffness in directions spanwise of the blade. A still further important feature and advantage of the blade of the invention is that the nose piece 50 is of such nature as to provide the entire blade with sufficient bending stiffness about the major axis of the blade to attain a high natural bending frequency, such as is necessary for example in the two-bladed "see-saw" type rotor for helicopter aircraft. All of the above mentioned features and advantages are obtained by the construction of the present invention, in combination with perfectly smooth aerodynamic surfaces throughout the entire blade structure under all conditions of flight. A still further advantage of the invention is that the fabrication design thereof is fully adaptable to any shape blade for maximum aerodynamic efficiency, and that the design permits for example the blade to be tapered in planform and thickness and geometrically twisted in spanwise direction.

I claim:

1. A rotor blade comprising a bent metal nose plate, said nose plate being of shallow chordwise extent compared to the overall chordwise extent of the blade adjacent the tip end of said blade and having a chordwise enlarged portion at the root end of said blade to form a hub connection portion, a blade body portion comprising upper and lower surface members arranged in spaced relation substantially throughout the chordal extent thereof, said surface members converging into contiguity at their trailing edge portions, said surface members each comprising spaced metal sheets of relatively light gauge as compared to said nose portion and having light weight filler material cemented therebetween, metal ledge strips mounted on the leading edge portions of said surface members and underlying the corresponding rear edge portions of said nose plate, and readily detachable connecting means extending through the rear edge portions of said nose plate and said ledge strips to releasably lock together said nose plate and said body portion.

2. A rotor blade comprising a bent metal nose plate, a blade body portion comprising upper and lower surface members arranged in spaced relation substantially throughout the chordal extent thereof, said surface members converging into contiguity at their trailing edge portions, said surface members each comprising spaced metal sheets of relatively light gauge as compared to said nose portion and having light weight filler material cemented therebetween, metal ledge strips mounted on the leading edge portions of said surface members and underlying the corresponding rear edge portions of said nose plate, and readily detachable connecting means extending through the rear edge portions of said nose plate and said ledge strips to releasably lock together said nose plate and body portion.

3. A rotor blade comprising a rigid metal nose plate substantially U-shaped in cross section, said nose plate having a chordwise enlarged portion at the root end of said blade forming a hub connection portion, a blade body portion comprising upper and lower surface members arranged in spaced relation substantially throughout the chordal extent thereof, said surface members converging into contiguity at their trailing edge portions, said surface members each comprising thin spaced sheets of light gauge metal having light weight filler material cemented therebetween, metal ledge strips mounted on the leading edge portions of said surface members and underlying the corresponding rear edge portions of said nose plate, and readily detachable connection means extending through the rear edge portions of said nose plate and said ledge strips to releasably secure together said nose plate and body portion.

4. A rotor blade comprising a rigid bent metal nose plate, a blade body portion comprising upper and lower surface members arranged in spaced relation substantially throughout the chordal extent thereof, said surface members converging into contiguity at their trailing edge portions, said surface members each comprising thin spaced sheets of light gauge metal having light weight filler material cemented therebetween, spanwise elongate metal ledge strip means mounted on the leading edge portions of said surface members and underlying the rear edge portions of said nose plate and said ledge strip means to releasably lock together said nose plate and body portion.

5. A rotor blade comprising a rigid bent metal nose plate, a blade body portion comprising upper and lower surface members arranged in spaced relation substantially throughout the chordal extent thereof, said surface members converging into contiguity at their trailing edge portions, said surface members each comprising thin spaced sheets of light gauge metal having light weight filler material cemented therebetween, metal ledge strips inlaid between the leading edge portions of said surface members and underlying the corresponding rear edge portions of said nose plate, and readily detachable connecting means extending through the rear edge portions of said nose plate and said ledge strips to releasably lock together said nose plate and body portion.

6. A rotor blade comprising a rigid rolled metal nose plate, a blade body portion comprising upper and lower surface members arranged in spaced relation substantially throughout the chordal extent thereof, said surface members converging into contiguity at their trailing edge portions, said surface members each comprising thin spaced sheets of light gauge metal having light weight filler material cemented therebetween, metal strip means mounted on the leading edge portions of said surface members, said strip means being stepped to provide ledges underlying the corresponding rear edge portions of said nose plate, and readily detachable connecting means extending through the rear edge portions of said nose plate and said ledges to releasably lock together said nose plate and body portion.

ARTHUR SCHNITT.

REFERENCES CITED

The following references are of record in the file of this patent:

UNITED STATES PATENTS

| Number | Name | Date |
|---|---|---|
| 1,822,940 | Sunstedt | Sept. 15, 1931 |
| 1,874,685 | Wright | Aug. 30, 1932 |
| 1,976,480 | Carleton | Oct. 9, 1934 |
| 2,152,861 | Bennett | Apr. 4, 1939 |
| 2,183,158 | Bennett | Dec. 12, 1939 |
| 2,307,708 | Northrop | Jan. 5, 1943 |
| 2,310,765 | Dornier | Feb. 9, 1943 |
| 2,341,997 | Law | Feb. 15, 1944 |
| 2,426,130 | Wald | Aug. 19, 1947 |
| 2,460,351 | Hoffman | Feb. 1, 1949 |
| 2,479,342 | Gibbons | Aug. 16, 1949 |